United States Patent [19]
Ramsey

[11] 3,872,479
[45] Mar. 18, 1975

[54] METHOD AND APPARATUS FOR RECORDING AND RETRIEVING RAILROAD LOCOMOTIVE SPEED DATA

[76] Inventor: William K. Ramsey, 253 Christine Dr., Decatur, Ill. 62526

[22] Filed: June 1, 1972

[21] Appl. No.: 258,858

[52] U.S. Cl.................... 346/1, 33/1 C, 346/18
[51] Int. Cl........................................... G07c 23/00
[58] Field of Search ... 346/18, 17, 33 D, 25, 65–67, 346/1; 33/1 C

[56] References Cited
UNITED STATES PATENTS

| | | | |
|---|---|---|---|
| 946,265 | 1/1910 | Park et al. | 33/1 C |
| 1,458,451 | 6/1923 | Wallbillich | 346/18 |
| 1,459,087 | 6/1923 | Cox | 346/49 |
| 2,203,667 | 6/1940 | Buechmann | 346/25 |
| 2,481,563 | 9/1949 | Bevins | 33/1 C |
| 2,845,712 | 8/1958 | Stimler | 33/1 C |
| 2,846,288 | 8/1958 | Fryklund | 346/17 UX |
| 2,959,459 | 11/1960 | Ryan | 346/7 |
| 3,300,785 | 1/1967 | Richardson et al. | 346/17 |

*Primary Examiner*—Joseph W. Hartary
*Attorney, Agent, or Firm*—Lockwood, Dewey, Zickert & Alex

[57] ABSTRACT

A highly simplified and economical system for recording and retrieving railroad locomotive speed data is disclosed. The system utilizes a "universal" recording tape having a base line printed thereon and also utilizes a read-out template having printed thereon the miles per hour read-out calibrations for a number of different kinds of recorders.

The invention eliminates the necessity for maintaining an inventory of a large number of differently printed recording tapes, decreases the likelihood that an incorrect recording tape will be installed in a locomotive speed recorder, reduces the cost of printing the individual tapes, and reduces the wasted time and motion on the part of the mechanic resulting from his having incorrect tapes available when fresh tape is installed.

7 Claims, 6 Drawing Figures

PATENTED MAR 18 1975　　3,872,479
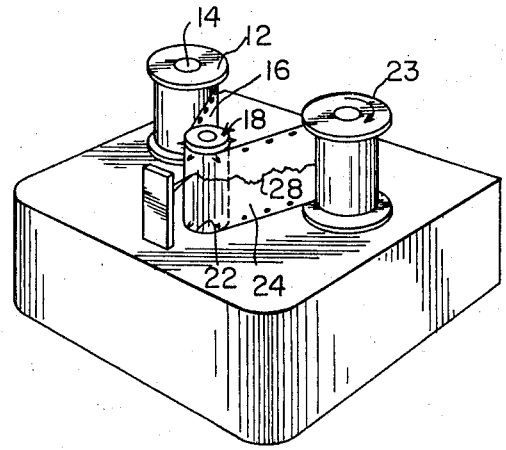
FIG-1.
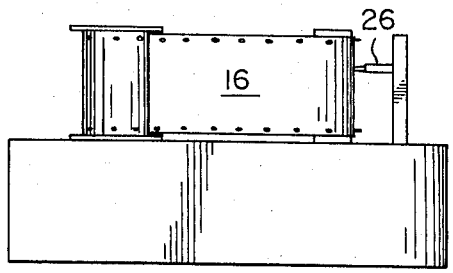
FIG-2.
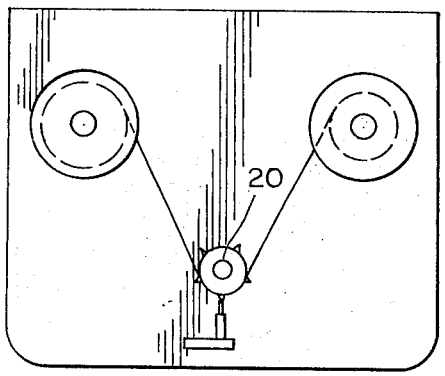
FIG-3.
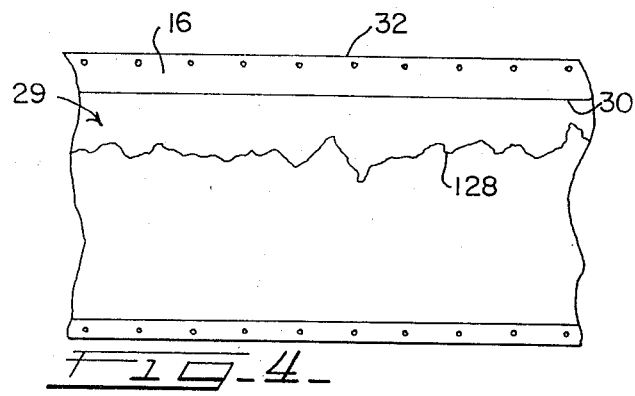
FIG-4.
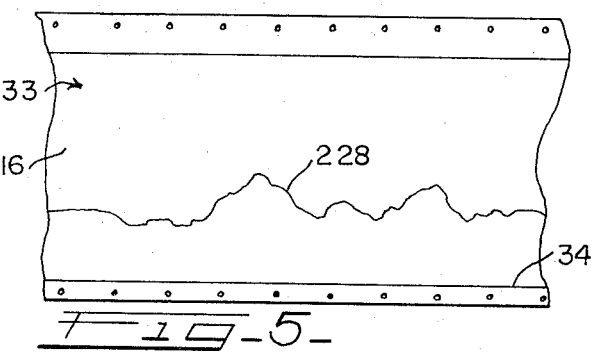
FIG-5.
FIG-6.
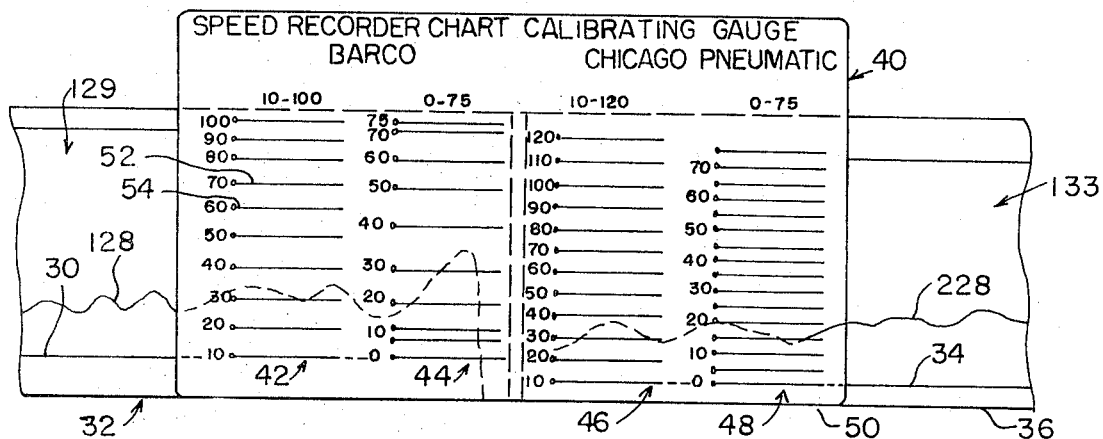

METHOD AND APPARATUS FOR RECORDING AND RETRIEVING RAILROAD LOCOMOTIVE SPEED DATA

The invention relates to an improved method and apparatus for recording and retrieving railroad locomotive speed data. More particularly, this invention provides a universal locomotive speed recording tape having printed thereon a recorder base line, which tape is particularly adapted to have printed thereon a plot corresponding to the speed of the locomotive at any point in distance travelled. This invention also provides a read-out template for use in conjunction with said tape, which read-out template has printed thereon a plurality of respective vertical-axis (with respect to said base point) speed calibrations for a number of different respective recorders.

A typical railroad company has a large number of locomotives. A typical railroad company, for example, has locomotive speed recorders in its locomotives which have been manufactured by several locomotive speed recorder manufacturers. Depending on the type of service in which a particular locomotive is employed, the speed recorders will be selected to operate over a particular speed range. For example, each of two major locomotive speed recorder manufacturers provides at least two operating range recorders. For example, one of these leading locomotive speed recorder manufacturers provides a speed recorder which records in the range 0 to 75 miles per hour, and another speed recorder which is ajusted and calibrated to record in the range 10–100 miles per hour. A second leading locomotive recorder manufacture provides one locomotive speed recorder which records in the range 0–75 miles per hours, and another recorder which records in the range 10–120 miles per hour.

These recorders use a roll of recording tape which, for example, is colored and coated with wax or some other suitable easily removed material. Both of the leading manufacturers provide a stylus in the recorder which scrapes away the surface coating beneath the point of the stylus and thereby generates a legible plot on the recorder tape as the tape moves past the stylus. The plot corresponds and indicates the speed of the locomotive. The length of tape utilized is directly proportional to the distance of travel by the locomotive. One leading locomotive speed recorder manufacturer utilizes a tape driving drum having sprockets, and in which the sprocket projections mate with holes along the edges of the recorder tape. The distance between each sprocket hole corresponds to 1 mile traveled by the locomotive.

Prior to the present invention, railroad companies have been required to carry large inventories of locomotive speed recorder tape. The large inventories are partly because of the large number of miles traveled, and because tapes for each of the many types and ranges of recoders had to be kept on hand. For example, one of the leading locomotive speed recorder manufacturers provides recorders in which the stylus traces a plot from a base line beginning at the bottom of the tape as the tape is moved horizontally along its long axis, in front of the stylus recording point, and in which the stylus moves farther upwardly away from the base line as the speed increases, and this manufacturer provides two recorders which operate under two recording ranges. A second leading locomotive speed recorder manufacturer provides locomotive speed recorders in which the stylus operates from a base line which runs along the top edge of the paper as the paper is fed along its long axis horizontally in front of the stylus, and in which the stylus moves further away downwardly from the base line as the speed of the locomotive increases. The latter speed recorder manufacturer also provides two operating range recorders. Thus, for example, the railroad company which has locomotives utilizing recorders from two leading locomotive speed recorder manufacturers is required to maintain inventories of tapes for all four types of recorders.

It is noted that the tapes provided heretofore have a number of horizontal lines printed thereon, running the entire length of the tape. Each line corresponds to a particular miles per hour reading. These tapes have the miles per hour numbers printed at close intervals along the entire length of the tape. One tape has miles per hour lines thereon, measuring from the bottom of the bottom edge towards the top of the tape. Another type of tape has miles per hour increments reading from the base line at the the top of the tape and reading downwardly.

The necessity for utilizing a large number of different kinds of tapes differently printed both with respect to miles per hour ranges and upwardly reading and downwardly reading, necessarily complicates the tape printing or manufacturing process picture and the manufacturer's inventory picture, both factors contributing substantially to the increased cost of the tape to the railroad company. The necessity of having four types of tapes available for recorders produced by two leading manufacturers, for example, increases the expense on the part of the railroad company inasmuch as a relatively large inventory of different tapes must be maintained and distributed for use. A third substantial cost factor associated with the speed recording tapes is attributed to the wasted motion on the part of the mechanics replacing tapes, which wasted motion is incurred whenever the mechanic at the locomotive recorder finds he does not have with him the particular tape required by the particular recorder.

In addition to the substantial cost considerations another major disadvantage has been found to flow from the complicated speed recorder tape inventory requirements. Even though all of the tapes on locomotives at the time of an accident are closely examined, particularly with respect to the speed of the locomotive at the moment of the accident, the vast majority of locomotive speed recording tapes are never examined in their entirety after they are taken out of the recorder. Occasionally, a tape may be scanned to check the performance of a train crew, such as for example, to make a spot check on whether or not the locomotive is traveling within some particular speed limit in a zone. Thus, because of the considerable nuisance of either having the mechanics carry all four types of tapes with them, or because of the nuisance of having to return to a store room for a different type of speed tape, there is at least some inclination on the part of the mechanic "to risk it" and not install fresh tape when the correct tape is not immediately available on the job site. It has been found that locomotive speed recorders commonly will not be outfitted with the necessary and proper speed recorder tape. Thus, at the moment of derailments, for example, there have been numerous instances in which none of the recorders on a multiple locomotive train had proper speed recording tapes operating therein, or had any speed recording tape whatsoever.

The unavailability of a written record of the speed of a train at the precise moment of an accident or derailment and the inability to effectively spot check the speed of locomotives can be regarded as far outweighing in importance the rather substantial cost considerations associated with the previously available, rather complicated inventory of speed recorder tapes.

It is an object of the present invention to provide a method and apparataus for recording and retrieving locomotive speed data which is relatively simplified, and which eliminates the need for printing different types of tape for each different kind of recorder.

It is another object of the present invention to provide a method and apparatus for eliminating the need for maintaining an inventory of differently printed locomotive speed recorder tapes for each of the different types of locomotive speed recorders which are in service in a particular railroad company.

It is a further object of the present invention to provide a method and apparatus for recording and retrieving locomotive speed data which eliminates the need for the mechanic to carry with him different kinds of tapes for each of the different types of locomotive speed recorders he services.

It is an important object of the present invention to provide a highly simplified and streamlined method and apparatus for recording and retrieving locomotive speed data which, in part because of its simplicity, results in greatly increased likelihood that any given locomotive will be properly outfitted with correct locomotive speed recording tape at the moment of an accident, such as a derailment.

These and other objects which will be apparent hereinafter are all achieved in accordance with the present invention which is described generally and in connection with certain preferred embodiments hereinafter with the aid of the accompanying drawings in which:

FIG. 1 is a simplified perspective view of a locomotive speed recorder with its cover removed;

FIG. 2 is a side elevational view of the locomotive speed recorder shown in FIG. 1;

FIG. 3 is a top view of the locomotive speed recorder shown in FIG. 1;

FIG. 4 is an illustration of segment of speed recording tape of the present invention on which a plot is recorded from the top base line;

FIG. 5 is an illustration of a segment of the tape of the present invention on which a locomotive speed plot is recorded from the bottom base line; and FIG. 6 is an illustration of a locomotive speed recorder chart calibrating gauge which is laid over two separate speed recording tape segments.

Referring to the drawings in greater detail, a locomotive speed recorder is indicated generally by the numeral 10. Locomotive speed recorders are conventional and well known, and consequently many of the details of their construction need not be included herein. For example, the recorder 10 includes conventional connections to portions of the locomotive driving system, as well as conventional internal couplings for advancing the recorder tape in proportion to the distance traveled by the locomotive, and these are not shown because conventional.

A feed roll 12 of recorder tape is installed over feed spindles 14, and the tape 16 is fed around a registration roll and drive cylinder 18 which includes a sprocket 20 (FIG. 2) at either end thereof, which sprocket includes regularly spaced-apart bosses 22. Tape 16 is taken up on receiving roll means 23.

Bosses 22 engage regularly spaced-apart holes 24 along the edges of the tape 16 and this assists in the proper and correct advancing of tape 16 in direct proportion to the distance traveled by the locomotive. A speed stylus 26 is activated by a conventional means to move away from a base line on the tape 16 a distance in response to the speed of the locomotive to leave a plot 28 on tape 16. The distance which stylus 26 moves from a base line on the recording tape, that is, the perpendicular distance between a base line and a point on plot 28, may not be directly proportional to speed, but it is necessary that, for a particular type of recorder, the operating characteristics be reproduceable and predetermined so that the data on the chart can be retrievable with respect to the speed of the locomotive. Not all locomotive speed recorders utilize sprocketed drums 18 to advance tapes 16, and in some instances, other tape-driving systems are employed. It is unnecessary to make any changes in the tape advancing mechanisms, etc, in such other driving systems, in order to use the single universal tapes in accordance with the present invention. However, it may be necessary, in some instances, to convert the spindle sizes, e.g. spindles 14 to accomodate a standard spool 12. However, such features only relate to means for attaching the tape to the respective recorders 10, and does not affect the height of the plots 28, 128, 228, and does not effect the respective base lines 30, 34 from which the particular recorder operates.

Examples of recordings 29 and 33 are illustrated in FIGS. 4 and 5 respectively. In FIG. 4 a plot 128 is made downwardly from base line 30 which is relatively widely spaced apart from edge 32 of tape 16. Stylus 26 is positioned on base line 30 in its zero or reference position, in this type of machine. In FIG. 5 plot 228 is made from base line 34 which is relatively close to edge 36 of tape 16.

Thus recording 29 illustrates the type of plot obtained using the recorders of one of the leading manufacturers of locomotive speed recorders, which manufacturer provides recorders in which the recording stylus operates from a base line 30 near the top edge 32 of tape 16. Similarly recording 33 illustrates the type of plot made by those recorders in which the stylus 26 operates from a base line 34 near the bottom edge 36 of tape 16. Hence plot 228 is drawn from base line 34 in this type of recorder. In accordance with this invention, base lines on the universal tape 16 are placed to coincide with a normal base line for the type of recorders to be used, and no other speed reference or calibration indicia are required. In fact, no speed calibration indicia should be printed on tape 16 because it merely tends to confuse the interpretation of the data, once plotted.

Hence, in accordance with the present invention, speed recorder 10 is supplied with a tape 16 on which at least one base line 30, 34, or some other reference indication is provided. As will be more fully understood as a result of the discussion of the use of the template of the present invention, edges 32, 36 can serve as a calibration base reference, although provision of printed base lines such as lines 30, 34 is highly preferable.

Referring now to FIG. 6, a transparent data retrieval template 40 includes a number of columns 42, 44, 46 48 of indicia through which plots 128, 228 are efficiently translated into numerical data. Each column of speed indicia is appropriately identified, such as for example, by a heading having the name of manufacturer and the miles per hour range of the particular recorder. In the preferred embodiment, each column of indicia 42, 44, 46, 48 includes a plurality of lines 52 which are parallel with edge 50, which lines 52 have a perforation 54 centered at the left end thereof, and each respective line 52 and corresponding hole 54 has a numeral indicating miles per hour adjacent thereto. Perforation 54 is adapted to receive a pencil point therethrough for marking a particular portion of the tape, if desired. The distance between the base marking or "zero" and any particular speed indicia marking on template 40, is exactly the same as the distance between the base position of stylus 26, that is, on base lines 30, 34, when the recorder is in base or zero reference condition, and the position of the stylus when plotting curves 28, 128, 228 when the locomotive is traveling at the speed indicated by that particular indicia marking.

In FIG. 6, recording 129 corresponds to the type of recording represented by 29 in FIG. 4, and recording 133 corresponds to the type of recording represented by 33 in FIG. 5. Thus the recoding 29 is inverted for reading with template 40 with base line 30 being placed immediately under corresponding reference line 44, assuming recordings 29, 129 are made on a locomotive speed recorder which operates in the 0–75 miles per hour range.

Thus, in the illustration at the left half of FIG. 6, and assuming recording 129 was made in a 0–75 miles per hour Barco recorder, the template 40 makes it immediately apparent that the maximum miles per hour on plot 128 immediately before the sudden decrease in speed is approximately 35 miles per hour.

A portion of record 133 is placed under the right hand portion of template 40, and it is immediately apparent that the maximum speed shown under column 46 is approximately 39 miles per hour. It is also noted that the base line 34 is placed under the corresponding base reference, that is, the base line of the 10–120 mile per hour range, or 10 miles per hour line which is the lowest or base reference line in column 10–120. Thus, by placing the base lines 30, 34, under the base line of the appropriate indicia column on template 40, locomotive speed recorder plots 28, 128, 228 can be read efficiently in the region under the indicia of the appropriate column.

In a preferred embodiment of the present invention, the distance between edge 50 and the base line of columns 42, 44, is equal to the distance between edge 32 and base line 30 on tape 16, and the distance between edge 50 and base line of columns 46, 48 are substantially equal to the distance between base reference line 34, and edge 36, respectively.

Hence, in accordance with this preferred embodiment of the present invention, aligning the columns 42, 44 with base line 30 is facilitated since edge 50 of template 40, and edge 32 of recording 129 can be brought against a common stop such as a strightedge (not shown) and the recording 129 can be drawn from right to left under template 40 to permit a continuous quantitative scan of the plot 128 in the direction of travel of stylus 26 in which the plot was made. Likewise, edge 50 of template 40 and edge 36 of recording 133 can be superimposed mechanically by drawing these edges against a straight edge (not shown) in which case the recording 133, being drawn under template 40 from left to right provides a continuous quantitative scan of plot 228 in the same direction as the direction of travel of the stylus 26.

Whenever the tape roll 123 is removed from the recorder, the mechanic normally writes the locomotive identification and the date on the tape which is removed, and in accordance with the use of this invention it is preferred that the mechanic also write the name and operating speed range of the recorder involved. Alternatively, the type of recorder and range of speed of the particular recorder can be determined from records setting forth the identification of the respective recorders in the respective locomotives.

In accordance with the present invention, the need for maintaining and administering inventories of many different kinds of differently printed tapes is eliminated, and the work of the mechanics changing the tapes is made much more efficient. It eliminates the need for having a specific tape for a particular locomotive in a railroad company having many locomotives, and makes it less likely that the mechanics changing the tapes will be subjected to the nuisance and inconvenience of returning to a store room for a tape which is not immediately available at the job. The present invention also makes it much more likely that all of the locomotives in servixe will be properly outfitted with the necessary and proper tape. In extensive evaluation of the present invention in actual railroad operations it has been found that substantial economic savings have accrued and moreover the experience in using the system of the present invention shows that it is far more likely that all locomotives will be properly outfitted with a proper locomotive speed recorder tape.

I claim:

1. An improved method of recording and retrieving locomotive speed data utilizing a common elongated tape record medium which accomodates and is compatible with a plurality of different kinds of locomotive speed recorders that differ from each other in that they respectively produce a speed plot on said elongated tape record medium based on different speed scales or speed scale orientations, said method comprising:

installing said common elongated tape record medium on any given one of said plurality of different kinds of locomotive speed recorders;

producing a speed plot on said elongated tape record medium of the speed conditions experienced by said locomotive in accordance with the characteristics of said given one of said plurality of different kinds of locomotive speed recorders; and, retrieving the speed recorded by said given locomotive speed recorder on said elongated tape record medium by utilizing an overlay having a plurality of separate sets of speed calibration indicia, each set of which respectively corresponds to one of said plurality of different kinds of locomotive speed recorders, said overlay and said tape record medium each being provided with alignable registration means for registering the appropriate set of said separate sets of speed calibration indicia on said overlay with said speed plot to provide the user thereof with a readout of the speed information represented by said speed plot.

2. The improved method of claim 1 wherein said elongated tape record medium is free of speed indicia.

3. The improved method of claim 1 wherein said tape record medium registration means comprises a base line imprinted on said elongated tape record medium which is generally parallel to the marginal edge of said elongated tape record medium adjacent thereto.

4. The improved method of claim 3 wherein the distance between said base line and said adjacent marginal edge of said elongated tape record medium is equal to the distance between said overlay registration means and an adjacent edge of said overlay.

5. The improved method of claim 1 wherein said tape record medium registration means comprises at least two base lines which are respectively used to register different sets of speed calibration indicia on said overlay with the speed plots produced by at least two different of said plurality of different locomotive speed recorders.

6. A combination for utilizing a common elongate tape record medium for recording and retrieving locomotive speed data from a plurality of different kinds of locomotive speed recorders that differ from each other in that they respectively produce a speed plot on said elongated tape record medium base on different speed scales or speed scale orientations, said combination comprising: a common elongate tape record medium adapted to be operatively received on each of said different kinds of locomotive speed recorders and to have speed plots produced thereon which are respectively characteristic of each of said plurality of different kinds of locomotive speed recorders, said common elongate tape record medium being free of speed indicia and including tape record medium registration means; and, an overlay having a plurality of separate sets of speed calibration indicia, each of which respectively corresponds to each of said plurality of different kinds of locomotive speed recorders, said overlay being further provided with overlay registration means alignable with said tape record medium registration means for registering the appropriate set of said speed calibration indicia on said overlay with a speed plot produced on said elongate tape record medium by any one of said plurality of different kinds of locomotive speed recorders to provide an accurate speed readout of said speed plot; said tape record registration means including at least two base lines which are generally parallel to the marginal edges of said elongated tape record medium adjacent thereto which tape record registration means are respectively used to register different sets of speed calibration indicia on said overlay with the speed plots produced by at least two different of said plurality of different locomotive speed recorders, the distance between at least one of said base lines and the marginal edge of said elongated tape second medium adjacent thereto being equal to the distance between said overlay registration means and an adjacent edge of said overlay.

7. The combination of claim 6 wherein said overlay is transparent.

* * * * *

UNITED STATES PATENT OFFICE
CERTIFICATE OF CORRECTION

PATENT NO. : 3,872,479
DATED : March 18, 1975
INVENTOR(S) : William K. Ramsey

It is certified that error appears in the above-identified patent and that said Letters Patent are hereby corrected as shown below:

Column 1, line 58, "recoders" should read --recorders--
Column 2, line 59, after "speed" insert --recorder--
Column 5, line 27, "recroding" should read --recording--
Column 5, line 63, "strightedge" should read --straightedge--
Column 6, line 30, "servixe" should read --service--

Signed and Sealed this twenty-ninth Day of July 1975

[SEAL]

Attest:

RUTH C. MASON
Attesting Officer

C. MARSHALL DANN
Commissioner of Patents and Trademarks